Patented July 10, 1951

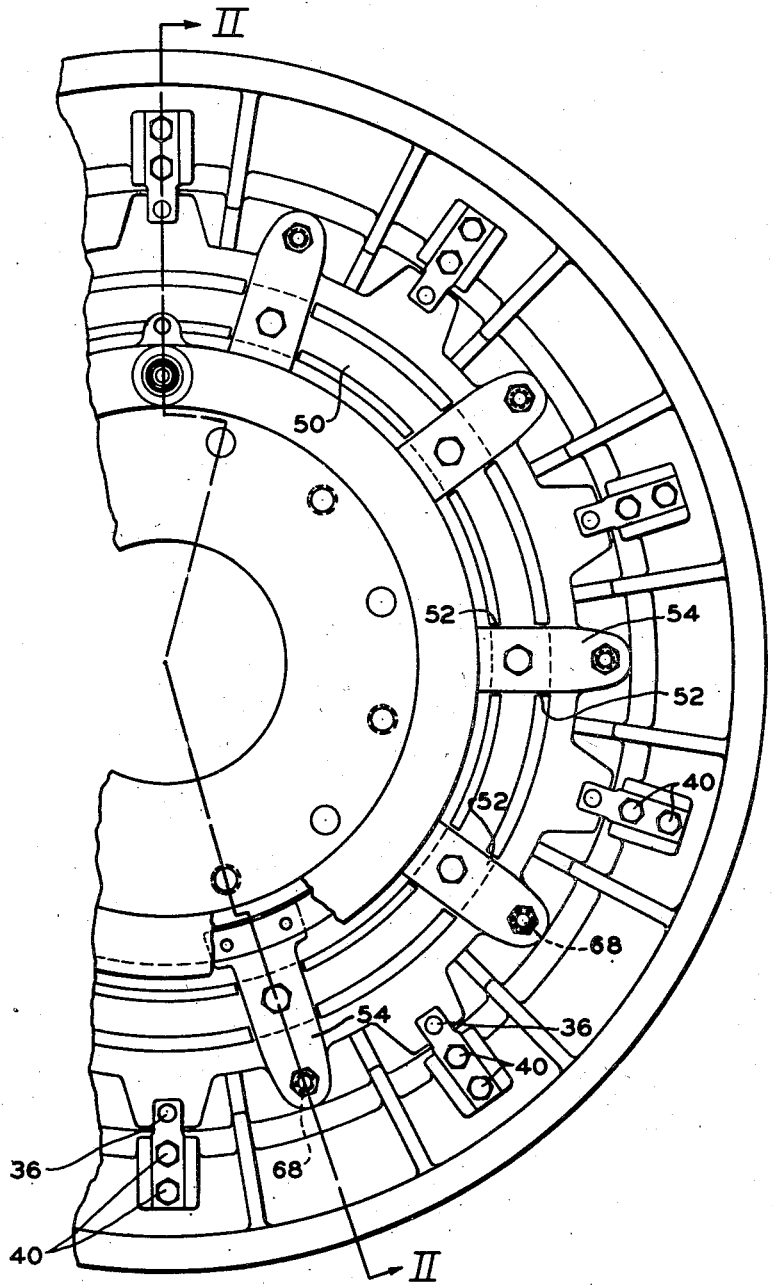
Fig I
Inventor
ERWIN F. LOWEKE

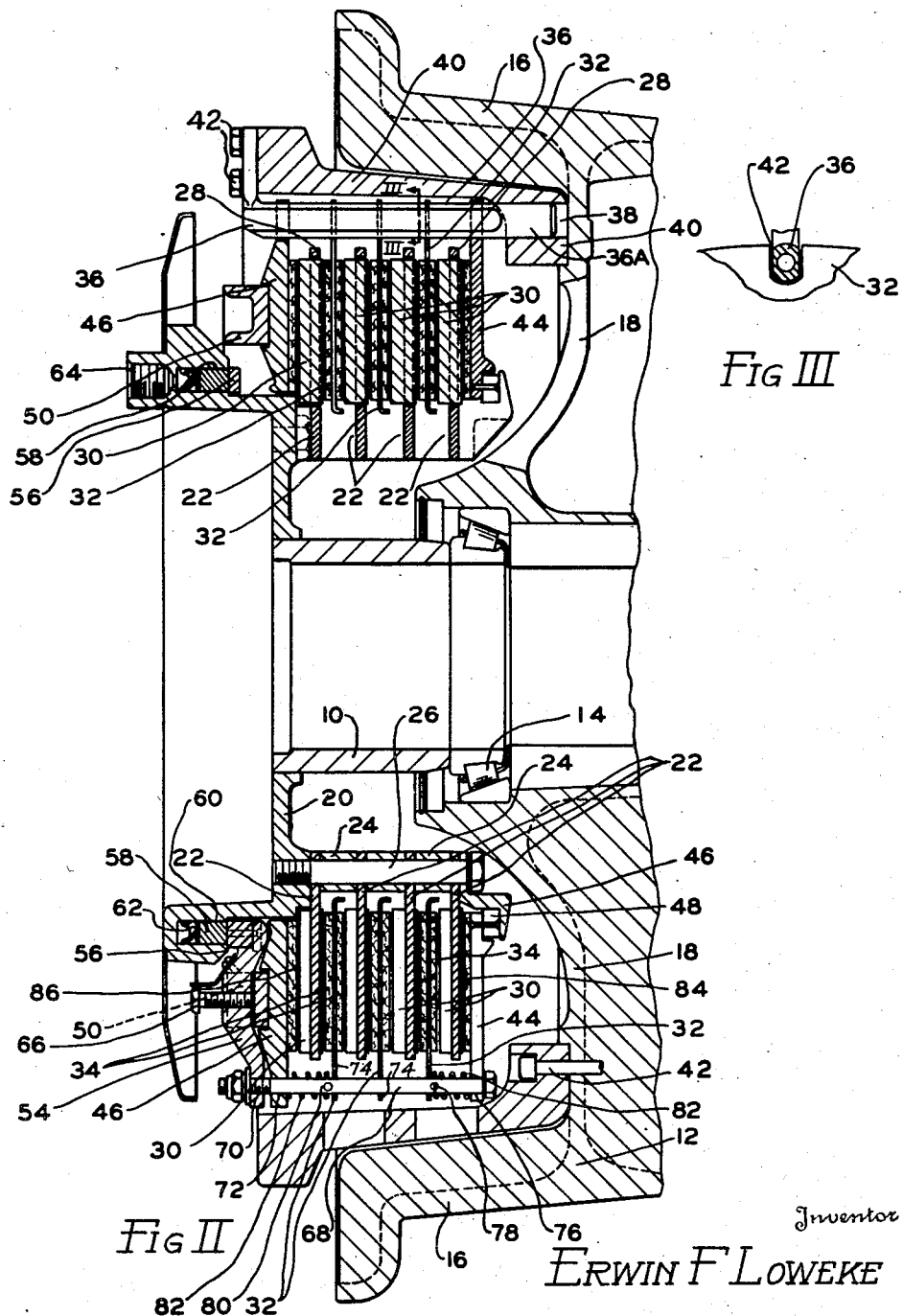

2,559,885

UNITED STATES PATENT OFFICE 2,559,885

DISK BRAKE

Erwin F. Loweke, Jackson, Mich., assignor, by mesne assignments, to The B. F. Goodrich Company, Akron, Ohio, a corporation of New York Application November 28, 1947, Serial No. 788,421

8 Claims. (Cl. 188—72)

The invention relates to improvements in disc brakes of the type which includes adjacent interleaved discs some of which are fixed and carry blocks of heat absorbing material, such as cast iron, and whereas the rotary discs inter-leaved therewith carry brake linings for engagement with these blocks during the application of the brakes.

In prior disc brake construction, it has been the practice to engage only one side of each heat absorbing disc with a brake lining disc upon brake application. This arrangement is open to an objection that the blocks tend to be heated only on one side thereof which is engaged by the coacting brake lining, with the result that these blocks tend to become distorted or warped.

It is the principal object of the present invention to overcome this objection to the prior brake construction and to provide an improved brake construction, particularly as to the mode of applying the braking pressure and the arrangement of the interleaved brake discs, such that the heat absorbing blocks are subjected to frictional rubbing contact on both sides thereof in the application of the brake, whereby a uniform heating of all these blocks is obtained and distortion or warping thereof is thereby avoided.

This, and other objects, residing in the arrangement, combination and construction of the brake parts will be apparent from a consideration of the following description in conjunction with the accompanying drawings in which:

Fig. I is a partial end elevation of an embodiment in accordance with the invention, Fig. II is a section on the line II—II of Fig. I, and Fig. III is a section of a detail.

Referring to the drawings there is shown a wheel and brake structure comprising a relatively fixed hub 10 having a wheel body 12 mounted thereon through the medium of the bearing 14. The wheel body 12 includes a rim 16, which is supported by a radial web 18. A radial torque spider 20 is fixedly mounted with respect to the hub 10 and carries a plurality of annular discs 22 axially spaced by spacers 24. The discs 22 and spacers 24 are clamped to the torque spider 20 by axially extending bolts 26, disposed in circumferentially spaced parallel relationship about the hub 10 and carried by the radial spider 20. The discs 22 each have a plurality of circumferentially spaced openings 28 in which are disposed brake surface elements 30 which are preferably in the form of cast iron segmental blocks and which are loosely mounted in said openings 28 for free axial floating movement.

There are inter-leaved with the discs 22 other discs 32, on the opposite faces of which are secured continuous annular brake lining elements 34, which are arranged adjacent the brake surface elements 30 so that where a disc 32 is situated between a pair of said discs 22 the said disc 32 presents brake lining elements 34 for engagement with the opposite surfaces of the brake surface elements 30. The discs 32 are driven with respect to the wheel body 12 by a plurality of circumferentially spaced axial hollow bars 36 each having a rounded end 36a mounted in a bore 38 in a bracket 40 secured to the web 18, each said bar being at its opposite end secured to the bracket 40 by screw studs 42. The driving relation between the discs 32 and the bars 36 is through notches 42 in the peripheries of the discs 32 as particularly shown in Fig. III.

The brackets 40 are primarily adapters to adapt the brake disclosed to the particular wheel disclosed. It will be apparent that the bars 36 could be mounted directly on the wheel when the brake and wheel dimensions are properly proportioned.

The brake lining elements 34 and the brake shoe elements 30 are clamped together between clamping plates 44 and 46. The clamping plate 44 is in the form of an annular disc, rotatably driven in the same manner as the discs 32 by the bars 36, and riding in an angular bracket supported by the bolts 26. An anti-friction ring 48 is provided between the plate 44 and the bracket. The ring 48 is preferably of some low friction material such as carbon bearing metal or the like.

The plate 46 is in the form of an annular disc, having a flanged ring 50, secured to the outside thereof. The flanged ring 50 has a plurality of circumferentially spaced slots 52 therein, in each of which is disposed a radially extending arm 54. Each arm 54 is suitably secured, as by riveting, to a ring 56 slidable against the face of an annular piston 58, slidably disposed in an annular cylinder 60. Also disposed in the cylinder 60 is a sealing ring 62 of suitable resilient material. Pressure fluid is admitted to the annular cylinder 60 by a suitable connector 64. It is preferred that the ring 56 be of steel and that the piston 58 be of some low friction material, such as carbon bearing metal or the like.

Each arm 54 is free in its slots 52 in the flanged ring 50. Motion from the piston 58 is transmitted to the plate 46 through the ring 56, the arms 54 and screws 66 in the arms 54, which screws bear against the base of the flanged ring 50, as shown particularly in Fig. II.

In order to release the frictional engagement of the brake lining elements 34 with the brake shoe elements 30, when the braking pressure is released, there are provided a plurality of circumferentially spaced bolts 68 which extend through openings 70, 72, 74 and 76, in the arms 54, plate 46, discs 32 and plate 44, respectively. Each bolt 68 is provided intermediate its ends, and between the plates 44 and 46, with pins 78 and 80. Between each pin 78 and the adjacent plate and about the bolt 68 is arranged a helical spring 82. When the braking pressure is released, the springs 82 urged the plates 44 and 46 axially apart to release the braking pressure between the elements 30 and 34.

It should be pointed out that the arms 54 act as lever arms and that in the released condition of the brake, as seen in Figure II, the inner ends of the arms are held clear of the plate 46 by the action of the springs 82 with the lever arms 54 set to fulcrum about their outer ends.

As fluid pressure is admitted to the cylinder 60 through the fitting 64, the brake shoe elements 30 and the brake lining elements 34, together with the brake lining elements 84 and 86 on the inner faces of the plates 44 and 46, respectively, are forced together with the plate 46 being moved bodily to the right, by the pressure applied thereto through the medium of the annular pressure ring 50, and the discs 32 being also floatingly moved upon their supporting bars 36 due to the action of the loosely mounted brake blocks 30 being constrained to float sideways with respect to their fixed carrier plates 32. It will be apparent that not only do the discs 32 and the brake lining elements 34, 84, and 86 rotate relatively to the brake shoe elements 30 but also the plates 44 and 46 together with the arms 54 rotate relatively to the brake shoe elements 30, with the important result that as both sides of the outside blocks 30 of the brake assembly are subjected to the frictional rubbing contact thereby produced, these blocks will be evenly heated on both sides and distortion or warping thereof will, therefore, be prevented. During this relative rotation the anti-friction ring 48 supports the plate 44 against the re-action thrust of the piston. Also the ring 56 secured to the arms 54 slides against the piston 58.

It will be further apparent that as the annular pressure plates 44 and 46 are tied together at their outer peripheries by the bolts 68, and the latter are maintained in a state of tension, any tendency for the brake discs to spread apart is resisted.

Having thus described my invention what I claim is:

1. A wheel brake assembly comprising a wheel body, a relatively fixed wheel mounting structure, means mounting said wheel body for rotation upon said mounting structure, a series of brake lining elements carried by said wheel body in axially spaced relationship with respect to each other, a series of brake surface elements carried by said wheel mounting structure and inter-leaved with said brake lining elements so as normally to be dis-engaged from the latter and so that all the brake surface elements have brake lining elements disposed adjacent the opposite surfaces thereof, whereby all the brake surface elements are subjected, on their opposite said surfaces, to the frictional rubbing contact of their corresponding brake lining elements during the operation of the brake, and means for applying an external force to said assembly of brake surfaces and brake lining elements to cause them operatively to engage with one another so as to apply the brake.

2. A wheel brake assembly comprising a wheel body including a rim and a hub and a radially extending web connecting the rim and hub, a relatively fixed wheel mounting structure, means mounting said wheel body for rotation about said mounting structure, a plurality of annular disc elements carried by said wheel body in axially spaced relationship, brake friction linings carried by said disc elements, a plurality of other annular disc elements carried by said wheel mounting structure so as to intervene in the spaces between said first mentioned discs, said other disc elements carrying brake surfaces exposed to the opposite sides of the disc elements and the said first mentioned disc elements including disc elements disposed adjacent the outside of the outermost disc elements carrying the said brake surfaces, whereby all of the latter are subjected on both sides thereof to the frictional rubbing contact of their respective brake linings when the brake is applied, and means adapted to apply pressure to said assembly of disc elements and exerted in the axial direction in order to bring the friction linings and brake surfaces into braking engagement with one another.

3. A wheel disc brake comprising a wheel body, a plurality of annular brake discs supported by said wheel body in axially spaced relationship, a relatively fixed wheel mounting structure, a plurality of annular discs supported by said structure also in axially spaced relationship but inter-leaved with said first mentioned annular discs to provide a disc assembly, brake lining members fixedly carried upon the wheel supported discs, brake block members supported in position upon the structure supported annular discs for engagement on their opposite surfaces by said brake lining members, whereby a disc assembly is provided in which the opposite surfaces of all said brake block members are co-acted with simultaneously by said brake lining members in the application of the brake, means for applying the braking pressure to cause said brake lining and block members mutually to engage with one another, and tie means connected between the annular discs at their outer peripheries to resist an outward spreading movement thereof in the application of the brake.

4. A wheel brake as claimed in claim 3 wherein said means for applying the braking pressure is located adjacent the outside of one side of said inter-leaved disc assembly, and anti-friction means located adjacent the outside of the opposite side of said inter-leaved disc assembly and positioned to support the assembly against the thrust imposed thereon from the said one side of the assembly.

5. A brake of the character described, comprising a first series of axially spaced discs, brake lining elements supported on said discs, a second series of axially spaced discs interleaved with said first series of discs, brake shoe elements carried on said second series of discs, a pressure applying disc on the outside of said interleaved disc assembly at one side thereof, a thrust co-active disc at the opposite side of said inter-leaved disc assembly, pressure applying means associated with said pressure applying disc, and axial tie members connecting the outer peripheral portions of said discs carrying the brake linings in position to resist any tendency for said discs to spread apart upon the application of the brake.

6. A brake as claimed in claim 5 wherein said means for applying the braking pressure comprises an annular pressure plate, an annular pressure ring, an annular piston for applying pressure to the ring, said ring and piston being in sliding relation to each other, and a plurality of radially extending circumferentially spaced fingers for transferring pressure from the ring to the plate.

7. A wheel brake assembly comprising a wheel body, a relatively fixed hub structure, means mounting said wheel body for rotation about said hub structure, a first series of annular discs rotatably carried by said wheel body and about said hub structure in perpendicularly extending and axially spaced relation thereto, brake linings on said annular discs, a second series of annular perpendicularly extending and axially spaced discs carried about said hub structure in fixed relation thereto and interleaved with said first series of discs, with one of the latter constituting the outside discs of each side of the interleaved disc assembly, brake blocks carried on said second series of discs and having opposite surfaces exposed to both sides of their respective discs in position for engagement by the brake lining of the immediately adjacent disc of said second disc series, the construction and arrangement being such that all the brake blocks have a corresponding brake lining for both their said exposed surfaces, and means externally of said interleaved disc assembly adapted to apply axial pressure thereto, whereby to cause said brake linings and brake blocks operatively to engage with one another.

8. A wheel brake assembly comprising a wheel body, a relatively fixed hub structure, means mounting said wheel body for rotation about said hub structure, a first series of annular discs rotatably carried by said wheel body and about said hub structure in perpendicularly extending and axially spaced relation thereto, brake linings on said annular discs, a second series of annular perpendicularly extending and axially spaced discs carried about said hub structure in fixed relation thereto and interleaved with said first series of discs, with one of the latter constituting the outside disc of each side of the interleaved disc assembly, brake blocks carried on said second series of discs and having opposite surfaces exposed to both sides of their respective discs in position for engagement by the brake lining of the immediately adjacent disc of said second disc series, the construction and arrangement being such that all the brake blocks have a corresponding brake lining for both their said exposed surfaces, means externally of said interleaved disc assembly and located adjacent the inner periphery of the outside disc at one side of the interleaved disc assembly in position to apply axial pressure to the said assembly at said location, whereby to cause said brake linings and brake blocks operatively to engage with one another and tie means interconnecting the outer peripheries of said first series of discs to hold the latter against spreading apart at their outer peripheries in the application of the brake.

ERWIN F. LOWEKE.

REFERENCES CITED

The following references are of record in the file of this patent:

UNITED STATES PATENTS

| Number | Name | Date |
|---|---|---|
| 1,493,433 | Guay et al. | May 6, 1924 |
| 1,554,394 | White | Sept. 22, 1925 |
| 2,016,359 | Corbin | Oct. 8, 1935 |
| 2,025,098 | Dudick | Dec. 29, 1935 |
| 2,071,788 | Gillett | Feb. 23, 1937 |
| 2,105,867 | Stewart | Jan. 18, 1938 |
| 2,190,767 | Benson | Feb. 20, 1940 |
| 2,199,785 | Dickson | May 7, 1940 |
| 2,218,616 | McCune et al. | Oct. 22, 1940 |
| 2,219,196 | Nystrom et al. | Oct. 22, 1940 |
| 2,279,484 | McCune | Oct. 22, 1940 |
| 2,423,882 | Frank | July 15, 1947 |